C. T. DICKEY.
METHOD OF PRODUCING GRIPS FOR TOOL HANDLES.
APPLICATION FILED APR. 10, 1915.
1,330,791. Patented Feb. 17, 1920.
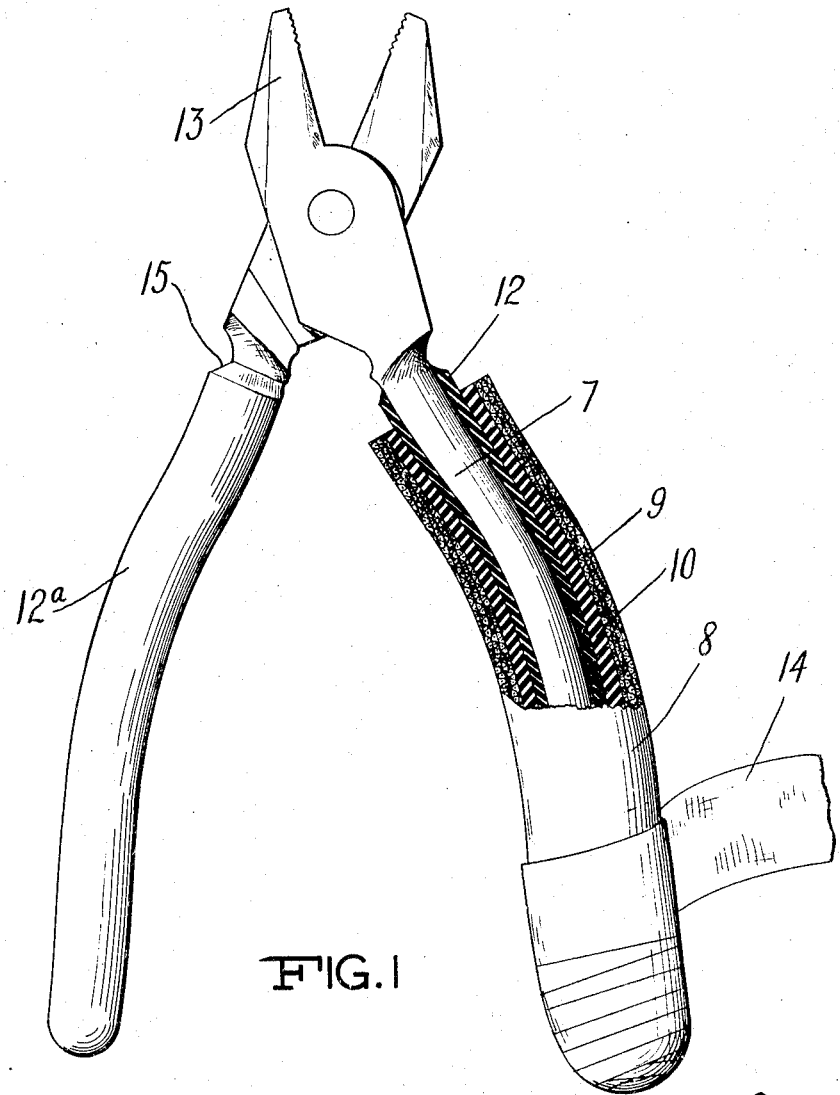

UNITED STATES PATENT OFFICE.

CHARLES T. DICKEY, OF ELIZABETH, NEW JERSEY, ASSIGNOR TO JOHN J. VOORHEES, JR., OF JERSEY CITY, NEW JERSEY.

METHOD OF PRODUCING GRIPS FOR TOOL-HANDLES.

1,330,791.  Specification of Letters Patent.  Patented Feb. 17, 1920.

Application filed April 10, 1915. Serial No. 20,429.

*To all whom it may concern:*

Be it known that I, CHARLES T. DICKEY, a citizen of the United States, residing at Elizabeth, in the county of Union and State of New Jersey, have invented certain new and useful Improvements in Methods of Producing Grips for Tool-Handles, of which the following, taken in connection with the accompanying drawings, is a full, clear, and concise description thereof.

The present invention relates to improvements in tools and implements generally and is more particularly directed to a method and means for providing rubber grips for tool and implement handles.

Various attempts have been made heretofore to apply rubber grips to the handles of pliers, chisels, and other tools by molding the rubber on to the tool handle and by other means. However, these methods have been more or less expensive, by reason of the fact, that it was necessary to have a large number of molds, or to constantly change the molds to suit the varied configurations of tool handles of a given type and, also, owing to the fact, that when the work was completed, the rubber was found to be so applied to the tool handle that it was not of a uniform thickness. This was particularly objectionable, since owing to the employment of comparatively hard rubber, it would readily break or crack on its thinner portions when coming in contact with a hard surface. As is well known, pliers and other tools of the character being described, are employed by telephone or telegraph linemen, who frequently throw them to the ground from a considerable height, so that the fracturing or breaking of the molded rubber grips is a frequent occurrence.

The principal object of the present invention is to provide a method and means of effecting a cohesion between the rubber and metal of the tool handles, whereby the rubber surrounding the metal will conform to the configuration thereof and will be of a uniform thickness throughout.

A further object of my invention, in addition to those heretofore recited, is to provide a method and means for applying rubber grips to tool handles in an economical manner, whereby soft rubber may be used and the rubber may be applied to the tool handle and the completed grip formed in a simple and expeditious manner.

My invention is also directed to a means and method for providing rubber grips for tool handles, whereby a single means may be used in conjunction with a considerable number of tool handles of a somewhat similar configuration, thereby dispensing with the necessity for a number of comparatively expensive molds for each shape of handle.

Furthermore, my improved means readily conforms to such variations in the contour of a number of tool handles of a general configuration as will naturally occur in the casting or forging of the tools, which is done with considerable rapidity without specific regard to the shape of the handle.

Other objects of my invention will become manifest and avenues for its employment will present themselves as the description proceeds and I would have it understood that the specific embodiment shown is merely employed to render a clear and comprehensive understanding of my invention and that I do not in any way limit myself to the particular details of operation or structure set forth or shown, reserving unto myself the full range of equivalents to which I am entitled without departing from the spirit and scope of my invention in its broadest aspect.

I shall now proceed to describe my invention with reference to the accompanying drawings and then point out with more particularity, the essential elements of novelty therein, in the appended claims.

In the drawings,

Figure 1 illustrates a pair of pliers of a conventional type showing the means I employ for producing cohesion between the rubber and the metal applied to one of the handles, while the other handle discloses a completed grip, and Fig. 2 illustrates the method of producing the former for applying the rubber to the tool handle.

Referring now to the drawings, in which like characters of reference are employed to designate similar parts throughout the several views, 7 indicates one of the usual metal handles of a pair of pliers, the handles being of the customary configuration. 8 represents the former, which I use in practising my invention, which is made up of a plurality of layers of fabric 9 and rubber 10, preferably applied as shown in section in Fig. 2. This former is produced on a mandrel 11, which is of a size slightly greater in circumference than the tool handle 7. The former may be produced in any suitable manner, such, for instance, as by applying a coating of rubber to the mandrel and then wrapping the rubber with the fabric 9, after which the whole may be submitted to vulcanization. It will be observed that the mandrel is of a configuration closely approaching that of the tool handle 7, so that the general contour of the former 8 follows that of the metal tool handle on which it is to be employed.

In applying the rubber grip 12 to the tool handle 7, the jaw of the tool 13 may be gripped in a vise or the like to hold it rigid, after which the soft rubber is applied to the tool handle, being spread thereupon to a thickness slightly greater than the interior diameter of the former 8. When this has been done, the former 8 is then forced on the tool handle over the soft rubber applied thereto, pressing it into close adhesion with the metal handle and simultaneously shaping the rubber to conform to the configuration of the outside of the handle 7 and the interior of the former 8, which latter by reason of its resilient structure readily conforms to the shape of the tool handle as it is forced thereupon.

When the former is in the position on the tool handle as shown in Fig. 1, the outside thereof is then bound or wrapped with tape, such as indicated at 14, or any other suitable fabric may be employed for the purpose. The tape or other fabric is roughly wrapped about the former and the whole submitted to a vulcanizing process. At the expiration of the requisite period, the tape or fabric 14 is unwound from the former 8 and the latter withdrawn from the tool handle, leaving the completed grip shown at 12ª. The upper end of the grip may be chamfered off, as shown at 15, to give it a finished appearance.

It will be obvious that in the application of the rubber grip to the tool handle by my method and means, the rubber will surround the metal handle in very close association and will be of a uniform thickness throughout, the employment of soft rubber reducing the possibility of bruising or breakage of the rubber grip to a minimum.

Having thus described my invention what I claim as new herein and desire to secure by Letters Patent is:

1. A method of producing rubber grips for metal tool handles, consisting in applying soft rubber to the tool handle, applying a yielding forming implement thereto to form the soft rubber to the configuration of the tool handle, wrapping the forming implement with a fabric and submitting the whole to vulcanization.

2. A method of producing rubber grips in close association with the metal of a tool handle consisting in first applying a coating of soft rubber to the tool handle, then placing a former upon the tool handle to shape the rubber to conform to the configuration of the tool handle, then wrapping the former with a fabric, then submitting the whole to a vulcanizing process, whereby the rubber will positively adhere to the metal of the tool handle, then removing the former from the tool handle, leaving a rubber grip of a uniform thickness relative to the tool handle throughout.

In testimony whereof I have hereunto set my hand this 8th day of April, 1915.

CHARLES T. DICKEY.